No. 819,569. PATENTED MAY 1, 1906.
F. T. MARTIN.
CORN SNAPPER AND FEED CUTTER.
APPLICATION FILED JULY 28, 1905.
4 SHEETS—SHEET 1.
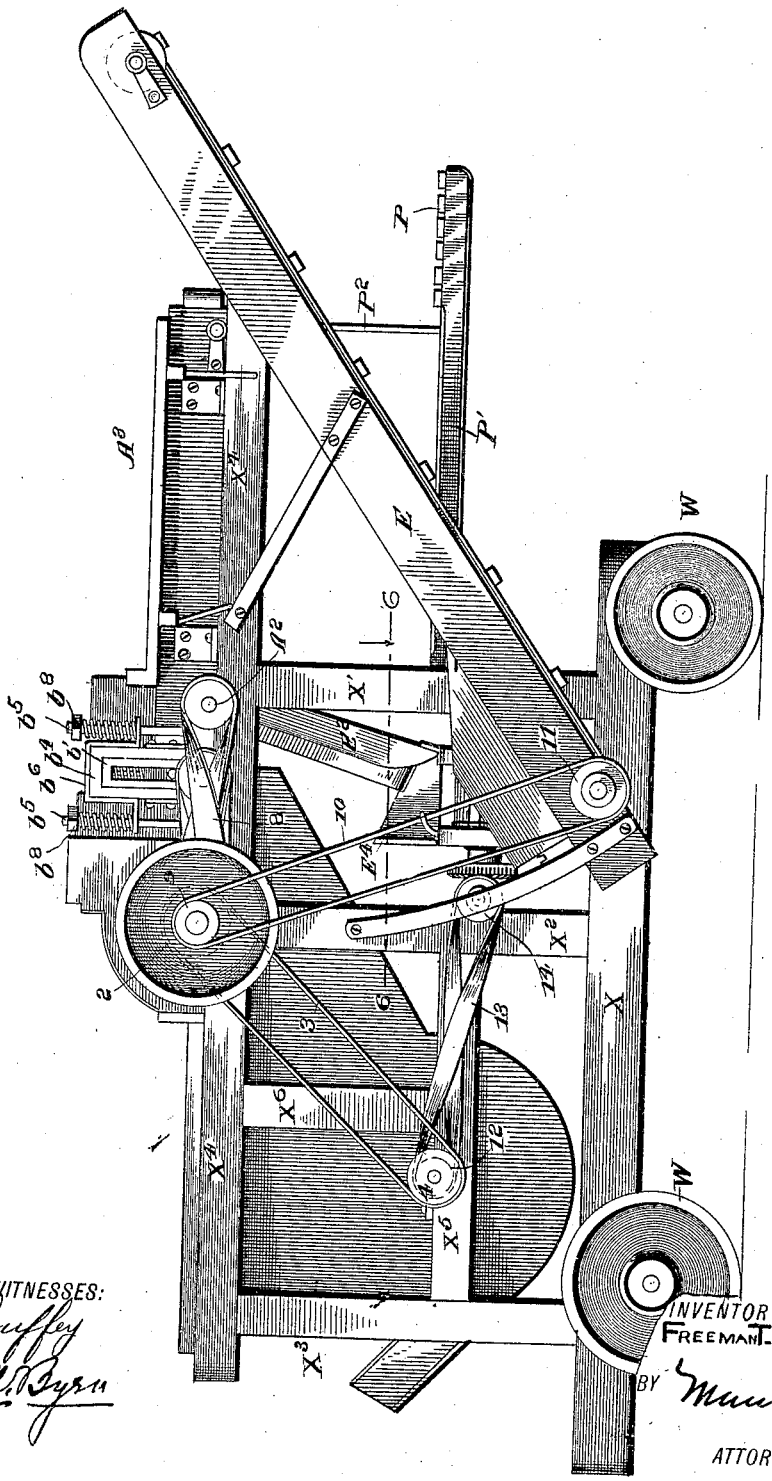

No. 819,569. PATENTED MAY 1, 1906.
F. T. MARTIN.
CORN SNAPPER AND FEED CUTTER.
APPLICATION FILED JULY 28, 1905.
4 SHEETS—SHEET 2.
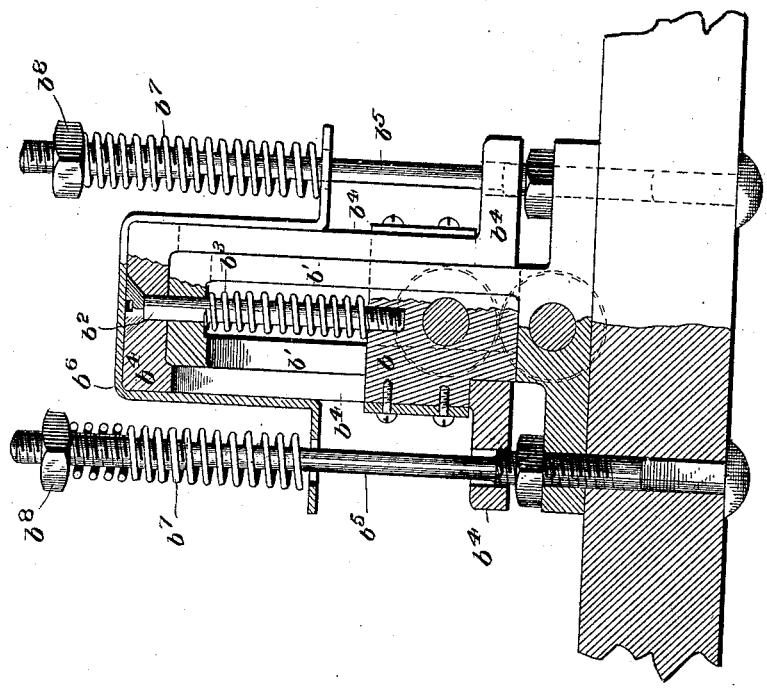
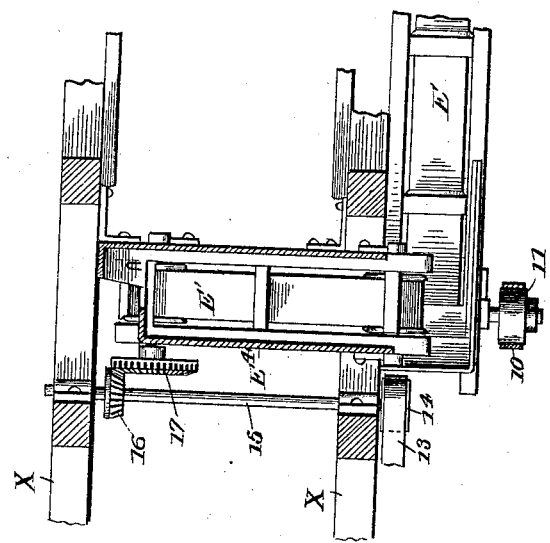
WITNESSES:
INVENTOR
FREEMAN T. MARTIN
BY
ATTORNEYS

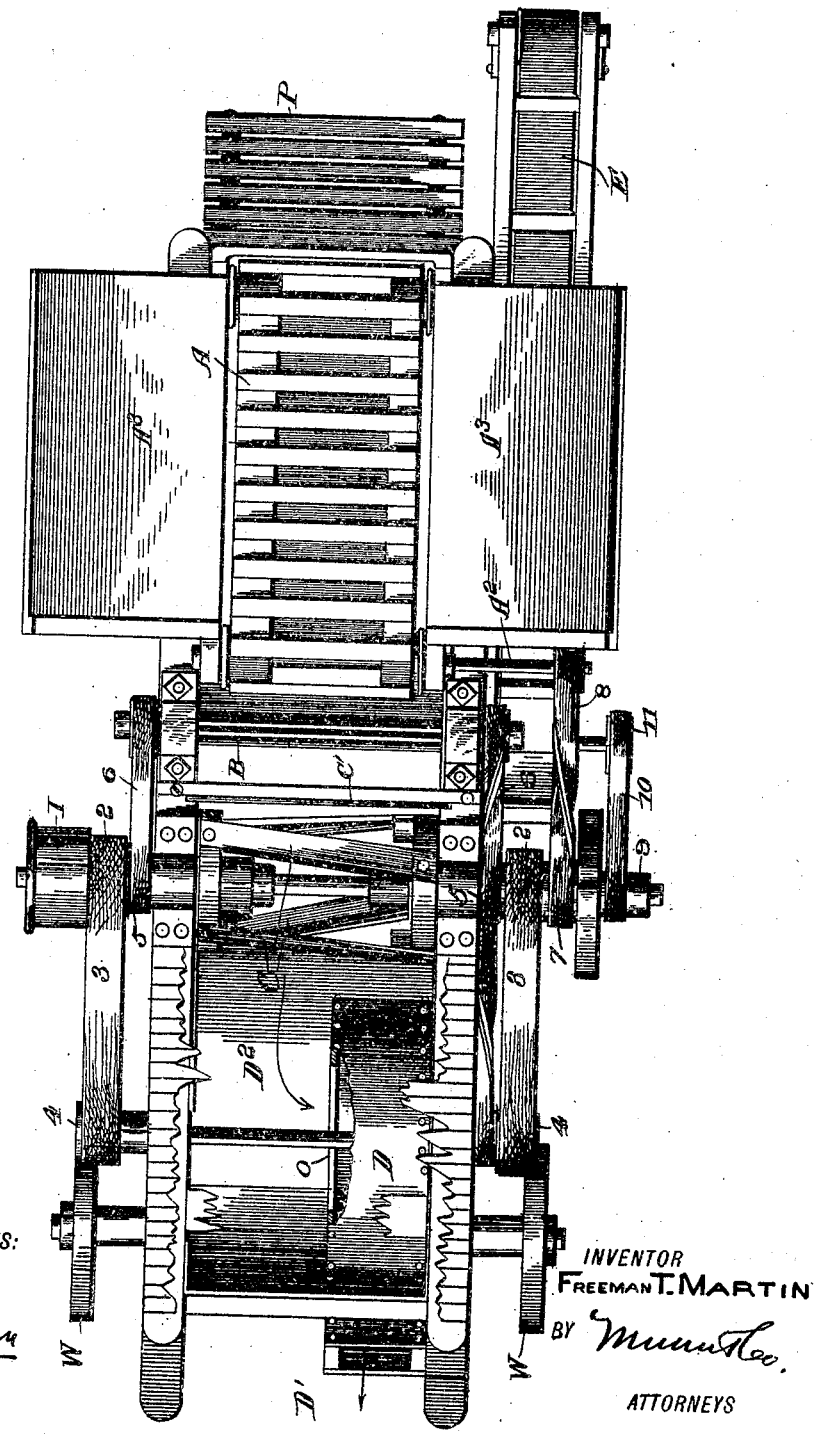

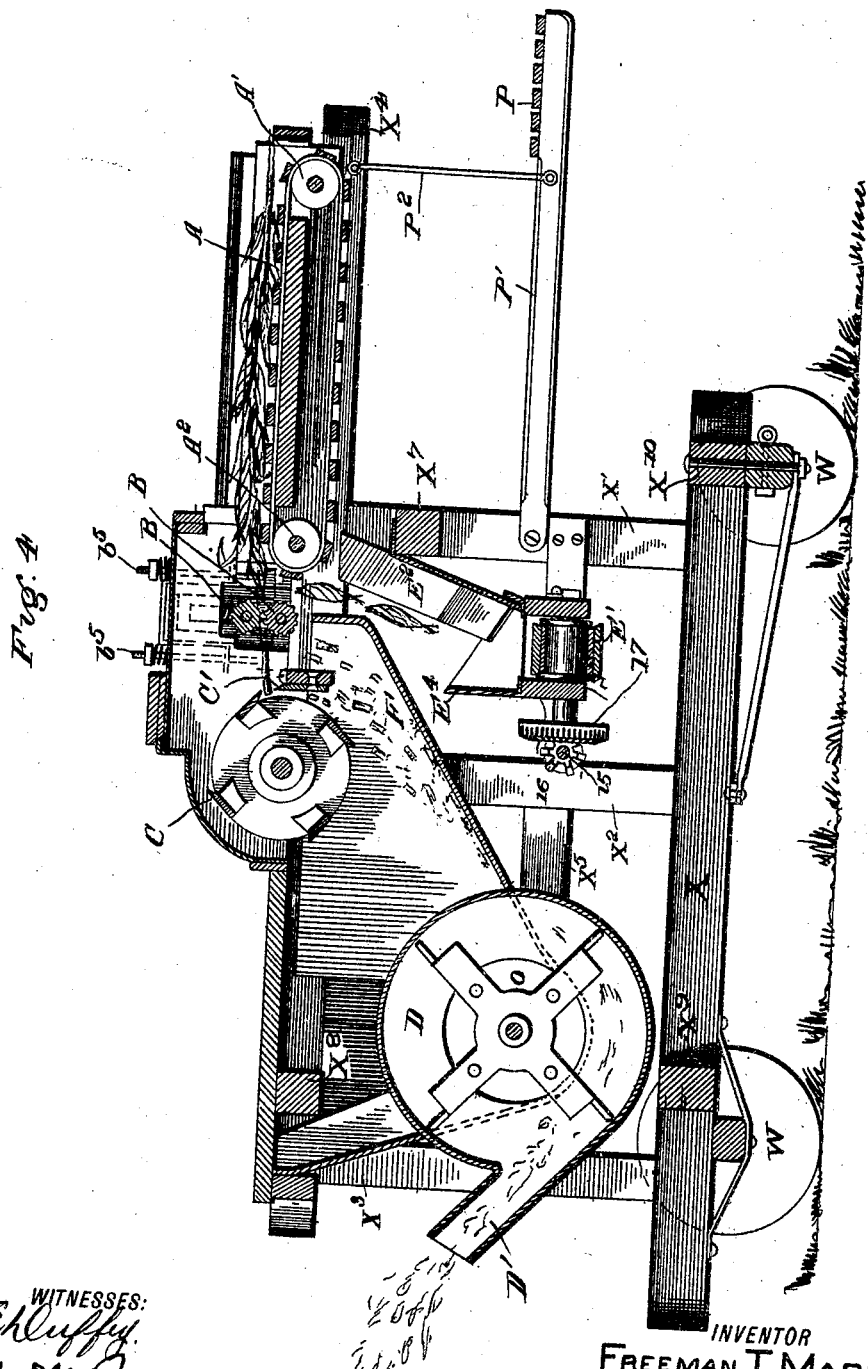

UNITED STATES PATENT OFFICE.

FREEMAN T. MARTIN, OF WINCHESTER, KENTUCKY.

CORN-SNAPPER AND FEED-CUTTER.

No. 819,569.  Specification of Letters Patent.  Patented May 1, 1906.

Application filed July 28, 1905. Serial No. 271,683.

*To all whom it may concern:*

Be it known that I, FREEMAN T. MARTIN, a citizen of the United States, residing at Winchester, in the county of Clark and State of Kentucky, have invented a new and useful Improvement in Corn-Snappers and Feed-Cutters, of which the following is a specification.

The object of my invention is to provide a machine adapted to take the stalks of corn as cut from the field with the fodder and ears still connected to the stalks and to snap or tear off the ears from the stalks and in the same operation cut the stalks and blades into short lengths for rough feed.

A further object is to so construct the machine as to permit it with slight adjustment to be adapted for cutting long feed into short lengths for ensilage or other purpose.

To these ends my invention consists in the novel construction and arrangement of parts, which I will proceed to describe with reference to the drawings, in which—

Figure 1 is a side elevation. Fig. 2 is a horizontal section taken on line 2 2 of Fig. 1. Fig. 3 is a plan view with the top of the casing removed. Fig. 4 is a vertical longitudinal section. Fig. 5 is an enlarged view of one of the bearings of the snapping-rollers.

In the drawings, Figs. 3 and 4, A is the feed-apron; B B, the snapping-rollers; C, the rotary cutter. D is the fan, and E E' the elevator for carrying up the ears which are snapped off the stalks and loading them into a wagon.

The entire machine is mounted upon axles with wheels W to permit it to be transported from place to place.

The framework of the machine (see Figs. 1 and 2) consists on each side of a horizontal sill X, vertical posts $X'$ $X^2$ $X^3$, a horizontal bar $X^4$, connecting the posts $X'$ $X^2$ $X^3$ at the top and extending at the feed end of the machine beyond the lower sills X. Between the standards $X^2$ $X^3$ is a horizontal bar $X^5$ a little above and parallel with the sill, and connecting this to the upper longitudinal bar is an upright $X^6$. The two sides of the frame as thus constructed are connected by suitable cross-bars $X^7$ $X^8$ $X^9$ $X^{10}$. (See Fig. 4.)

The feed-apron A (see Figs. 3 and 4) consists of an endless slatted belt traveling about pulleys $A'$ $A^2$ on two shafts journaled one at the inner and the other at the outer end of a frame mounted upon the extension of the upper longitudinal bars $X^4$. On each side of the frame of the feed-apron there is a receiving-table $A^3$, supported upon braces and extending laterally like wings to receive the cornstalks preparatory to being distributed upon the apron and fed to the machine.

P is the feeder's platform, which is carried upon two horizontal bars $P'$, connected to the main frame and supported by hangers $P^2$ from the feed-table frame.

The snapping-rollers B (see Figs. 3 and 4) are arranged one above the other and meeting on a line with the top of the feed-apron. Said rollers have roughened or serrated surfaces, and they serve the purpose of drawing the stalks and fodder-blades through between them and feeding them to the cutter; but said rollers are so set and strongly but yieldingly held together as to permit no ears of corn to pass through between them, but only the stalks are passed through and crushed, while the ears are held back and torn off and carried by an elevator, hereinafter described, to a suitable point of delivery.

The snapping-rollers are provided with a novel form of bearings which are designed to adapt the rollers either for snapping-rollers or for ordinary feed-rollers when the machine is used as an ordinary feed-cutter.

The journal of the upper roller B (see Fig. 5) is carried on each side in a metal block $b$, which slides vertically in a slotted upright stationary frame $b'$. A stem $b^2$ is connected to the top of block $b$ and extends through the top of frame $b'$, and a spiral spring $b^3$ is wound around this stem $b^2$ and bears at its lower end against the journal-block $b$ and at its upper end against the top of the slotted upright frame $b'$, and the tension of this spring serves to hold down the roller with a yielding pressure. Over the frame $b'$ there fits another frame $b^4$, slotted at its sides and ends and made yoke-shaped with its lower ends bent outwardly and perforated to receive two other vertical stems $b^5$ $b^5$, which are fixedly secured at the bottom on opposite sides of the journal-box. On this yoke-shaped frame $b^4$ is fitted a correspondingly-shaped cap-plate $b^6$, whose lower ends are bent outwardly and perforated to slide over the stems $b^5$. On these outwardly-bent ends are mounted two spiral springs $b^7$ $b^7$, which surround the stems $b^5$ and which are compressed with a variable degree of compression by screw-nuts $b^8$ and whose tension is thus put upon the cap-piece $b^6$ and is thence transferred to the top of the stem $b^2$, which extends up through the frame $b^4$, and through this stem is transferred to the journal-block $b$, so that this journal-block is forced downwardly with a variable and with a regulatable pressure both by the central spring $b^3$ and the two outside springs $b^7$ $b^7$. This is an important part of my invention, since the three springs at each end enable me to get a very strong pressure such as is necessary when the rolls B B are used as snapping-rolls and when only a light pressure is required on these rolls, as when the machine is only used as a feed-cutter the two outside springs $b^7$ $b^7$ and the cap-piece $b^6$ are taken off, and then the tension of the single central spring $b^3$ is all that is used to hold down the upper roll.

As the cornstalks pass from the rolls B they are projected into the range of action of the cutter C. (See Figs. 3 and 4.) This consists of a shaft with heads connected by horizontal cutting-blades set at a slight angle to the axis, so as to make a shear cut. These blades coact with a stationary blade C', set crosswise in the machine just in front of the rotary cutter. This stationary blade is a slight distance from the rolls B B, and beneath this space a chute F extends and leads down to the fan D, which blows the cut-up stalks out through the delivery-spout D' to any desired point. This fan (see Fig. 3) does not extend the full width across the machine, but only part the way across, and the chute is turned up on one side to form a receiving-chamber $D^2$ beside the fan, which delivers the cut-up pieces of cornstalks to the central side opening $o$ of the fan to be driven out through the delivery-spout D'.

The ears of corn which are held back and snapped off by the rolls B B drop down in front of the rolls and are guided by a chute $E^2$, Fig. 4, onto a transversely-arranged carrier-belt E', which at the side of the machine discharges them into an inclined elevator E, which carries them up to a point behind the feeder and discharges them into a wagon or other suitable receptacle. A flange or upright guard $E^4$ projects up in front of the carrier E' to prevent the ears from bouncing over the side of the same.

For driving the machine (see Fig. 3) a pulley 1 on the cutter-shaft receives power through a belt from an engine or other source of power.

The fan is run from two pulleys 2 2 on the cutter-shaft connected by two corresponding belts 3 3 to two pulleys 4 4 on opposite ends of the fan-shaft. By driving the fan from both ends of its shaft a more positive and more powerful action is obtained, and the fan is prevented from becoming clogged with the cut stalks, which is liable to occur with fans when used for this purpose.

Two small pulleys 5 5 on the cutter-shaft are connected by belts 6 6 to corresponding pulleys on the ends of the lower one of the snapping-rolls, which are driven at both ends to give them a more positive action. Another pulley 7 on the cutter-shaft is connected by a crossed belt 8 to a pulley on the extended shaft $A^2$ of the feed-apron A. Still another pulley 9 on the cutter-shaft (see Figs. 1 and 3) is connected by a belt 10 to a pulley 11 on the shaft of the lower roller of the elevator E, and for driving the carrier-belt E' below the snapping-rollers a small pulley 12 on the fan-shaft is connected by a crossed belt 13 to a pulley 14 on a cross-shaft 15, and this shaft has a bevel-gear 16, meshing with a bevel-gear 17 on the shaft of the driving-roller of the carrier-belt E'.

Having thus described my invention, what I claim as new, and desire to secure by Letters Patent, is—

1. A feed-cutter, comprising an endless feed-apron, a pair of rolls at the delivery end thereof, a rotary cutter on the opposite side of the rolls from the feed-apron and yielding bearings for the upper roll consisting of a journal-block, a vertical slotted frame inclosing the block, a stem rising from the block through the frame and having a spiral spring around it within the frame, a yoke-shaped piece inclosing the frame, a yoke-shaped cap above the latter, two vertical screw-threaded stems extending up through the ends of the yoke-shaped pieces, spiral springs arranged upon the ends of said cap and surrounding the stems and nuts screwed upon the stems to compress the springs substantially as described.

2. A corn-snapper and feed-cutter, comprising a casing, an endless feed-apron, a pair of snapping-rolls at the delivery end thereof, a rotary cutter having a shaft with a pulley on each end of the same, a chute below the rotary cutter having its lower end turned up to form a receiving-chamber, a fan located inside the casing and within the receiving-chamber and made of less width than the chute and having its central side opening in communication with the receiving-chamber of the chute, said rotary fan having a shaft extended beyond the sides of the machine and provided with a pulley at each end, and two belts connecting the two pulleys of the fan-shaft to two corresponding pulleys of the rotary cutter-shaft as shown and described.

FREEMAN T. MARTIN.

Witnesses:
E. E. ECTON,
W. T. STEVINSON.